(12) United States Patent
Eklöf et al.

(10) Patent No.: US 6,567,646 B1
(45) Date of Patent: May 20, 2003

(54) METHOD AND APPARATUS IN A RADIO COMMUNICATION SYSTEM

(75) Inventors: Jan Eklöf, Bromma (SE); Ingvar Andersson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/469,233

(22) Filed: Dec. 22, 1999

(30) Foreign Application Priority Data

Dec. 23, 1998 (SE) .............................................. 9804519

(51) Int. Cl.$^7$ ............................. H04B 1/00; H04B 17/00
(52) U.S. Cl. ..................... 455/63; 455/67.3; 455/226.3; 455/296
(58) Field of Search ......................... 455/62, 63, 67.1, 455/226.1, 226.2, 226.3, 226.4, 266, 296, 307, 67.3

(56) References Cited

U.S. PATENT DOCUMENTS

| | | | |
|---|---|---|---|
| 4,561,114 A | 12/1985 | Kozono et al. | 455/266.4 |
| 4,998,289 A | 3/1991 | Rabe et al. | 455/296 |
| 5,251,332 A | 10/1993 | Hansen | 455/266 |
| 5,323,337 A | 6/1994 | Wilson et al. | 702/73 |
| 5,396,657 A | 3/1995 | Jokinen | 455/307 |
| 5,554,955 A | 9/1996 | Myers | 329/317 |
| 5,603,087 A | 2/1997 | Shultz | 455/226.3 |
| 5,606,581 A | 2/1997 | Myers | 375/346 |
| 5,613,232 A | 3/1997 | Toshida et al. | 455/226.4 |
| 5,794,148 A | * 8/1998 | Mamaghani et al. | 455/226.2 |
| 5,867,766 A | * 2/1999 | Dinc et al. | 455/62 |

FOREIGN PATENT DOCUMENTS

EP 415610 3/1991

\* cited by examiner

Primary Examiner—Quochien Vuong (57) ABSTRACT

Variations in received signal amplitude caused by filter characteristics are reduced by a C/I measuring apparatus for a signal having a fluctuating carrier-frequency, comprising a filter for filtering the signal and means for splitting the signal into an RSS signal representing the signal strength and a BB signal representing the momentary carrier frequency deviation, comprising means for measuring the RSS signal unaffected by the frequency dependent attenuation in the IF filter. A method of measuring the C/I of a received signal is also disclosed. The method comprises the steps of filtering the signal using an IF filter to obtain one signal channel, feeding the signal to the FM detector and the RSSI unit, and measuring the signal strength of the received signal at a selected, substantially constant, carrier frequency.

10 Claims, 5 Drawing Sheets

METHOD AND APPARATUS IN A RADIO COMMUNICATION SYSTEM

TECHNICAL FIELD

The present invention relates to radio communication systems and in particular to the detection of disturbances in such systems in which Carrier over Interference (C/I) ratio is used to measure disturbances.

DESCRIPTION OF RELATED ART

In, for example, most Frequency Division Multiple Access (FDMA) systems the received signal on each channel is filtered out using an Intermediate Frequency (IF) filter. Variations in the amplitude of the received signal are then used to detect possible disturbance. Ideally, the IF filter should let the entire signal through in the appropriate frequency range of the filter and filter out all signals having frequencies outside of this range. With an ideal IF filter, therefore, an undisturbed signal would have a uniform amplitude for all frequencies within the frequency range of the channel. Since the IF filters used are not ideal, the signal is attenuated to a varying degree, depending on the frequency, so that the signal strength varies. Since the frequency of the signal is never entirely stable, the amplitude of the signal varies. The frequency of the signal varies, for example, with the amplitude of the modulated signal.

Such fluctuations in the amplitude of the signal are often mistaken for disturbances from another radio transmitter transmitting on the same frequency. The variations in frequency differ between different types of systems.

The same type of problems may occur in any type of radio communications network, where other type of transmitters than base stations may be used for communication with the mobile terminals.

Various measures can be taken to compensate for disturbances. Often a mobile telephone is ordered to change its frequency when a disturbance is detected. If there is another base station in the vicinity, the mobile telephone may be ordered to connect to this other base station instead of the one to which it is connected. The mobile telephone may also be ordered to increase its output power, to increase the C/I ratio. In extreme cases a radio transmitter may be ordered to disconnect from the base station.

These measures may be effective if taken when there is really a disturbance. If a disturbance is erroneously detected, they are, of course, useless. In prior art mobile telephone systems a mobile telephone may be ordered to change channels again and again, because a disturbance is erroneously detected.

Attempts to solve this problem include building better IF-filters. Building ideal filters is expensive, or even impossible.

It has also been attempted to compensate in the received signal for the imperfection of the filter. This requires very high processor capacity since each individual filter has different characteristics. Delay and beat must be taken into account, which is complicated.

SUMMARY OF THE INVENTION

It is an object of the present invention to provide a method and an apparatus for the reliable measurements of the disturbances to a received signal.

This object is achieved according to the invention by a C/I measuring apparatus for a signal having a fluctuating carrier frequency, comprising a filter for filtering the signal and means for splitting the signal into one part (RSS) representing the signal strength and one baseband part (BB) representing the momentary carrier frequency deviation, comprising means for measuring the RSS signal unaffected by the frequency dependent attenuation in the IF filter.

The object is also achieved according to the invention by a method of measuring the C/I of a received signal comprising the following steps:

Filtering the signal is filtered using an IF filter to obtain one signal channel. feeding the signal to the FM detector and the RSSI unit, measuring the signal strength of the received signal at a selected, substantially constant, carrier frequency.

According to a preferred embodiment the C/I measuring apparatus comprises means for determining at least one point in time when the BB signal is substantially equal to a constant carrier frequency deviation.

By measuring the received signal at points in time where the filter attenuation is substantially equal, the measurements become more reliable without the need for compensation.

In a first embodiment the C/I measuring apparatus comprises a level detecting unit for monitoring the BB signal and a sampling unit, the level detecting unit controlling the sampling unit in such a way that when the amplitude of the BB signal is equal to the level specified in the level detecting unit, the sampling unit samples the RSS signal.

In the first embodiment of the invention the method comprises the step of determining at least one point in time at which the BB signal is substantially equal to a constant carrier frequency deviation and measuring the RSS signal at this point in time.

This first embodiment can be implemented by software change only, to a prior art receiver unit.

In a second embodiment, the C/I measuring apparatus comprises means for determining at least one point in time at which the BB signal is substantially equal to the level specified in the level detecting unit and measuring the RSS signal at this point in time.

In the second embodiment the method comprises the steps of dividing the BB into measurement sequences;

taking at least one sample in each measurement sequence the BB signal;

selecting for each measurement sequence at least one sample nearest to the zero level; and sampling the RSS signal at the point or points in time corresponding to the at least one selected sample of the BB signal.

This is a hardware-based embodiment, which requires less processing power than the software-based embodiment, since the sampling is performed by hardware units.

In the second embodiment the C/I measuring device may also comprise means for dividing the BB signal into measurement sequences;

taking at least two samples in each measurement sequence of the BB signal; and interpolating between at least two samples in each measurement sequence to obtain at least one point in which the carrier frequency deviation is constant and hence the IF filter attenuation is constant, of the BB signal;

sampling the RSS signal at the point or points in time corresponding to the at least one calculation point of the BB signal.

This enables an more reliable approximation of the value of the signal at the exactly right point in time.

Preferably, the carrier frequency is selected so that the attenuation of the filter is substantially stable for frequencies near this carrier frequency.

This reduces the effects of small fluctuations of the frequency.

The selected carrier frequency may be substantially the centre frequency of the filter.

BRIEF DESCRIPTION OF THE DRAWINGS

The present invention will be described in more detail in the following, by way of preferred embodiments, and with particular reference to the drawings, in which.

DETAILED DESCRIPTION OF EMBODIMENTS

Figure 1:
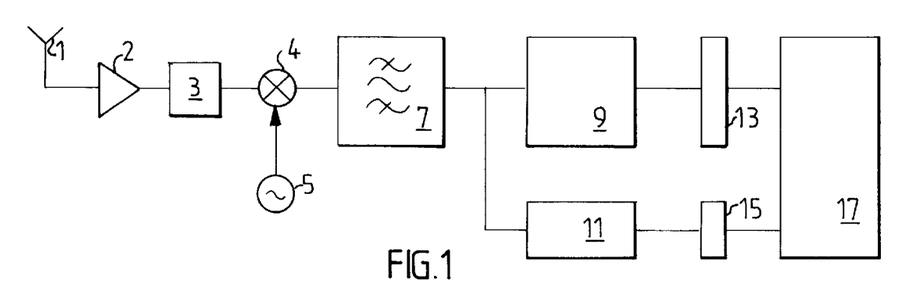
FIG. 1 shows a prior art receiving system for radio waves, for example in a mobile telephone.

FIG. 1 shows a prior art radio receiving device which may be used in a first embodiment of the invention. As common in the art, an antenna 1 receives the incoming radio signal, which is amplified in a low-noise amplifying unit 2 and then filtered in a filter unit 3 to produce a signal comprising the signals received on all channels. The received signal is then mixed in a mixing unit 4 with a reference signal generated by a local oscillator 5. The output from the mixing unit 4 is an intermediate signal with a frequency equal to the difference in frequency between the incoming signal from the antenna 1 and the reference signal. If, for example, the incoming signal has the frequency 900 MHz, and the reference signal has the frequency 830 MHz, the intermediate signal has a frequency of 70 MHz.

The intermediate signal is then filtered, in an Intermediate Frequency (IF) filter 7, to obtain each channel separately.

In the following description, only one channel will be discussed, for clarity. The output signal from the IF filter 7 is fed to an FM detector 9 and to a Received Signal Strength Indicator (RSSI) circuit 11. The output signal from the FM detector 9 is a baseband (BB) signal, and the output signal from the RSSI circuit 11 is a Received Signal Strength (RSS) signal. The BB signal and the RSS signal then pass through A/D conversion units 13 and 15, respectively, to a processing unit 17. The BB signal and the RSS signal will be described in more detail in connection with FIG. 3. The processing unit receives the BB signal and the RSS signal and calculates C/I based on these signals.

Figure 2:
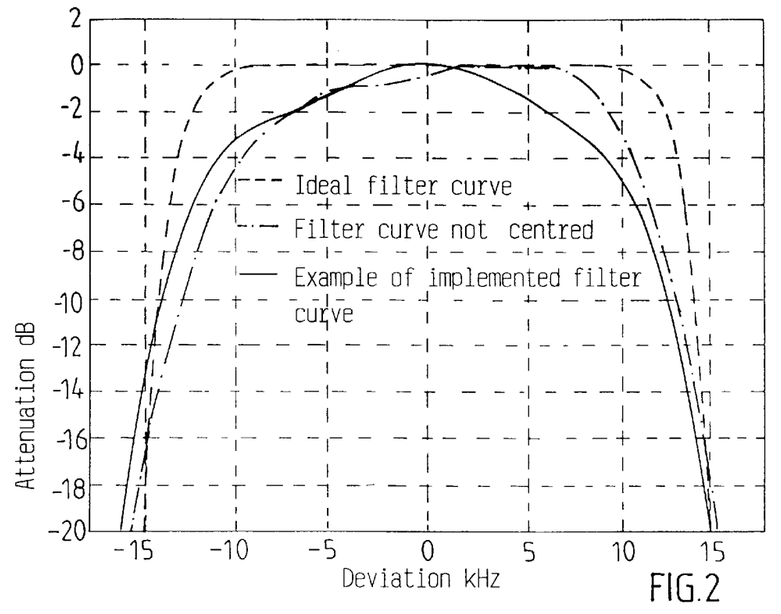
FIG. 2 shows a typical IF filter attenuation curve

FIG. 2 shows three different IF filter attenuation curves. The dashed line shows the characteristics of an ideal filter, which substantially cuts off all frequencies outside of the passband completely and lets through all frequencies within the passband with no attenuation. The solid line indicates the characteristics of a realistic filter, which lets through the frequencies within the passband with a varying attenuation which is lower near the centre frequency of the passband and increases towards the edges of the passband. The attenuation increases outside the passband, but frequencies outside the passband are not entirely cut off. The dotted line indicates the characteristics of another realistic filter, for which the filter curve is not centred, that is, the attenuation is lowest around a frequency different from the centre frequency.

As shown by the two filter attenuation curves representing realistic curves, the properties of such a filter are individual, and it is difficult to predict, or compensate for, the unideal properties of the filter. Because of the variations in attenuation, the signal strength of the received signal varies with the varying frequency of the signal. The frequency varies more or less depending on the type of system, but the principle problem is the same.

When determining the C/I ratio, the signal strength is sampled continuously. This variation in the detected signal strength resulting from the imperfection of the filter is often erroneously interpreted as a result of interference with another radio signal.

The solution according to the invention is to base the calculations only on the signal strength when the received signal has one particular frequency. This frequency could in theory be any frequency within the passband. However, it is most feasible to select a frequency near the centre of the passband where the attenuation is relatively stable for small variations in frequency. In this way, the precision of the measurements becomes less critical.

Figure 3:
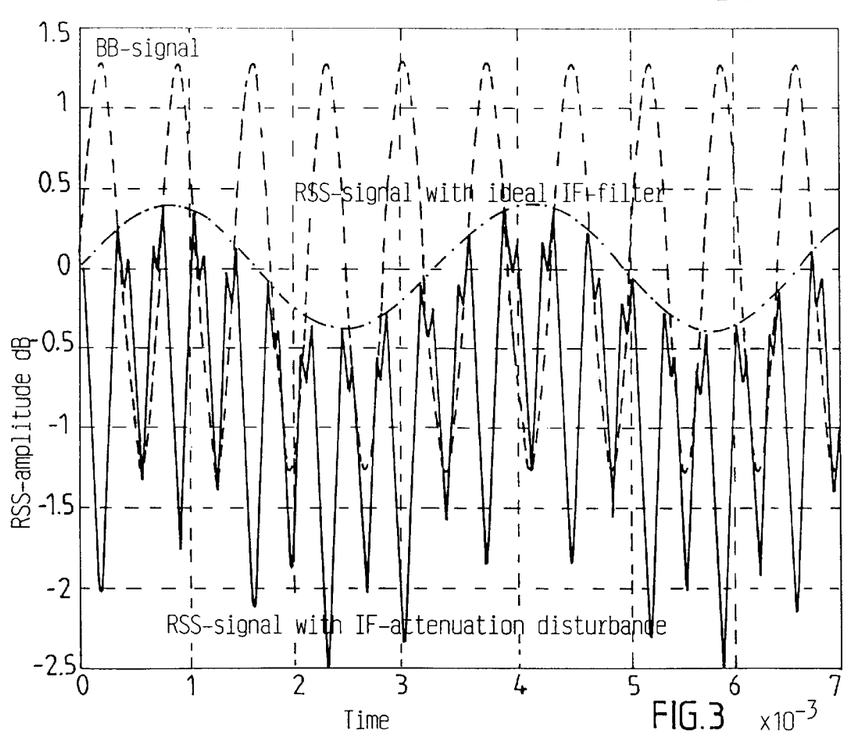
FIG. 3 shows the FM signal, the disturbed RSS signal, and the RSS signal without any disturbance.

FIG. 3 shows the demodulated FM signal, the RSS signal with and without the variations caused by the filter attenuation.

The dashed line shows the baseband signal, as a function of time. As can be seen, the baseband signal varies with time, at a relatively high frequency, but the mean value is substantially constant.

The solid line shows the signal strength of the carrier, that is, the RSS signal with the variations caused by the frequency dependent attenuation in the IF filter super-posed on it as a function of time.

The dash-dotted line shows RSS signal as it would be without frequency dependent variations, as a function of time. This is the result that would ideally be achieved according to the invention. The fluctuations in signal strength seen in the solid curve are often interpreted as the result of a disturbing radio transmitter.

Figure 4:
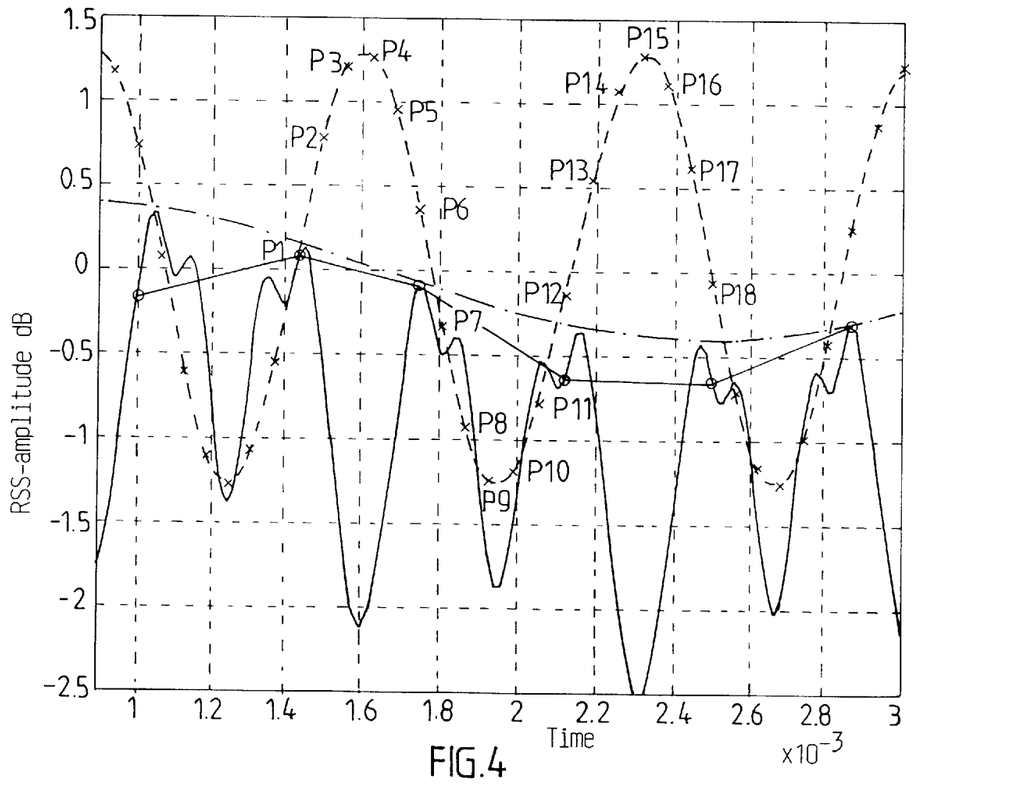
FIG. 4 shows the principle of measuring the signal amplitude according to a first preferred embodiment of the invention.

FIG. 4 shows a part of FIG. 3 magnified for clarity.

FIG. 4 illustrates how the undisturbed RSS signal shown by the dash-dotted line in FIG. 3 can be obtained according to the invention. The dashed line illustrates a sequence of the demodulated FM signal shown in FIG. 3. The solid line illustrates the corresponding sequence of the RSS signal with the fluctuations caused by the filter attenuation.

According to a first embodiment, the FM sequence shown in FIG. 4 has been sampled eighteen times at constant time intervals. Of course, an arbitrary number of samples may be taken, and the time between the samples may vary, if desired. The sampling points are indicated in the FIG. 4 by small x'es and numbered p1, p2, . . . , p18.

The sampling points are used to determine when the RSS signal should be sampled. The samples of the RSS signal are then used to construct the RSS signal without any disturbances from the filter, that is, the RSS signal that would have been received if the filter had been ideal.

The simplest solution for determining when the RSS signal should be sampled is to select the sampling point nearest to the mean baseband signal and to sample the RSS signal at the same point in time when this sampling point was taken. In the example shown in FIG. 4, the first sampling point p1 is identified as the one nearest to the mean signal. At the same point in time when this sampling point p1 was taken, the RSS signal is therefore sampled. This sample will not be taken at exactly the right time, but the approximation may be sufficiently good, depending on the filter quality and the frequency variations.

A more sophisticated solution is to interpolate between two or more sampling points to a higher accuracy in the calculation of the sampling reference point, which is usually zero. The RSS signal is then also interpolated to achieve the most accurate signal strength value corresponding to a fixed frequency deviation. The possibility of selecting more than one sampling point in the RSS signal is of course advantageous, in addition to the advantage of a more exact determination of the sampling points in time. The interpolation can be carried out according to any suitable interpolation algorithm known in the art.

These two solutions can both be implemented with only software changes. Functions may be implemented in the processor 17 shown in FIG. 1 to perform the sampling of the two signals and the interpolation if desired.

Figure 5:
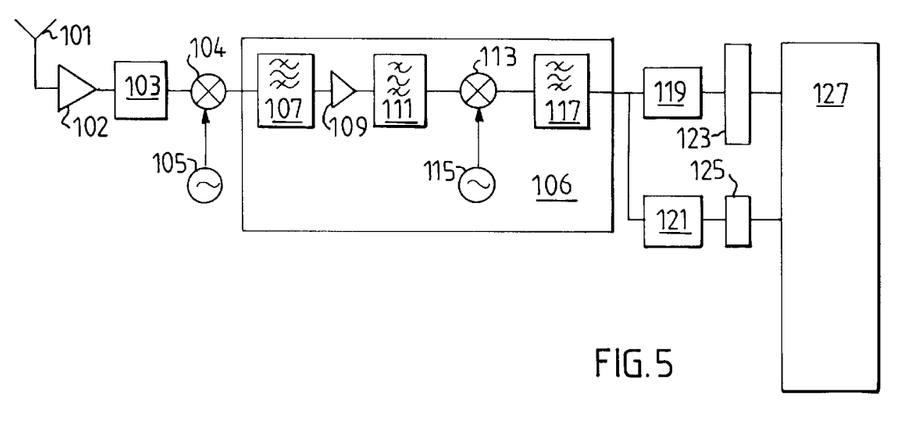
FIG. 5 shows a first, software based embodiment of the apparatus according to the invention.

A preferred embodiment for carrying out the embodiments described above, with software changes only, is shown in FIG. 5.

As in FIG. 1, an antenna 101 receives the incoming radio signal, which is amplified in a low-noise amplifying unit 102 and then filtered in a filter unit 103 to produce a signal comprising the signals received on all channels. The received signal is then mixed in a first mixing unit 104 with a reference signal generated by a first local oscillator 105. The output from the mixing unit 104 is an intermediate signal with a frequency equal to the difference in frequency between the incoming signal from the antenna 101 and the reference signal.

The intermediate signal is then filtered, in an Intermediate Frequency (IF) filter 106, to obtain each channel separately. In this embodiment, the IF filter 106 comprises several elements. The first element is a first IF filter in itself comprising a first part IF filter 107, an amplifier 109 and a second part IF filter 111. Letting the filter consist of two filters and amplifying the signal between them improves the filter characteristics. The output from the first part filter is amplified in an amplifying unit 109, before it is filtered again in a second IF filter 111. The output from the second IF filter 111 is mixed in a second mixing unit 113 with a reference signal generated by a second local oscillator 115, to produce a desired frequency which in this embodiment is 450 kHz. If the resulting frequency from the first mixing unit 103 is 70 MHz, as described in connection with FIG. 1, then the frequency of the reference signal generated by the second local oscillator 115 should be 70 MHz–450 kHz.

This implementation of the IF filter is of course only an example. Any implementation of the IF filter can be used with the apparatuses according to the invention.

In the following description, only one channel will be discussed, for clarity. The output signal from the IF filter unit 106 is fed to an FM detector 119 and to a Received Signal Strength Indicator (RSSI) circuit 121. The output signal from the FM detector 129 is a baseband (BB) signal, and the output signal from the RSSI circuit 121 is a Received Signal Strength (RSS) signal. The BB signal and the RSS signal then pass through A/D conversion units 123 and 125, respectively, to a processing unit 127. The BB signal and the RSS signal are similar to the ones described in more detail in connection with FIG. 3. The processing unit 127 receives the BB signal and the RSS signal and calculates C/I based on these signals.

According to a second embodiment, the points in time at which to sample the RSS signal can be determined more exactly. This embodiment, however, requires additional hardware. By continuously monitoring the FM signal, the points in time at which this signal is zero may be determined exactly. At the same points in time the RSS signal is then sampled.

Figure 6:
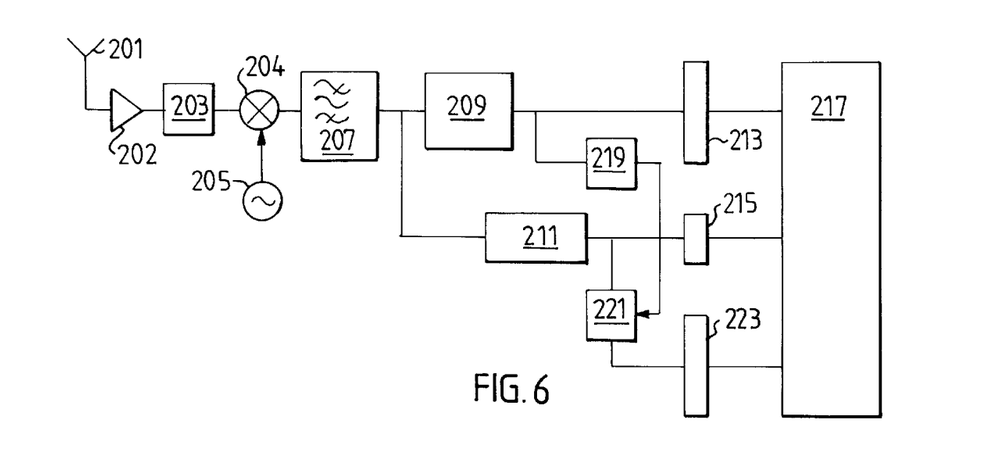
FIG. 6 shows a second, hardware based embodiment of the apparatus according to the invention.

FIG. 6 shows an apparatus for determining the points in time when the RSS signal should be sampled, according to this second embodiment. As in FIG. 1, an antenna 201 receives the incoming radio signal, which is amplified in a low-noise amplifying unit 202 and then filtered in a filter unit 203 to produce a signal comprising the signals received on all channels. The signal is then mixed in a mixing unit 204 with a reference signal generated by a local oscillator 205. This creates an intermediate signal with a frequency equal to the difference in frequency between the incoming signal from the antenna 201 and the reference signal. If, for example, the incoming signal has the frequency 900 MHz, and the reference signal has the frequency 830 MHz, the intermediate signal has a frequency of 70 MHz.

The intermediate signal is then filtered, in an IF filter 207 to obtain each channel separately.

In the following discussion only one channel will be considered, for clarity. The signal is fed to an FM detector 209 and to an RSSI circuit 211. The output signal from the FM detector is a baseband signal indicating the frequency deviation of the carrier, and the output from the RSSI circuit is an RSS signal. These signals were described in more detail in connection with FIG. 3. As in FIG. 1 the signals pass through A/D converters 213 and 215 respectively to a processing unit 217.

The baseband signal, which is the output signal from the FM detector 209, representing the frequency deviation of the carrier, which is used to determine the attenuation in the IF filter, is monitored by a level detector 219. Each time the amplitude of the signal passes a specified level, the level detector 219 triggers a sampling unit 221 which samples the RSS signal in the other branch at exactly the time when the baseband signal passes the level. From the samples of the RSS signal, the RSS signal can be generated as it would look if the IF filter had been almost ideal. This RSS signal can then be used to determine if any real disturbances have occurred. The specified level may, for example, be selected as the zero level.

The baseband signal is continuously monitored by the level detecting unit 219. When the amplitude of the baseband signal is the same as the level specified in the level detector, it triggers a sampling unit 221 to sample the RSS signal. The sample is passed through an A/D converter 223 to the processing unit 217 in which the samples are used to regenerate the RSS signal.

Figure 7:
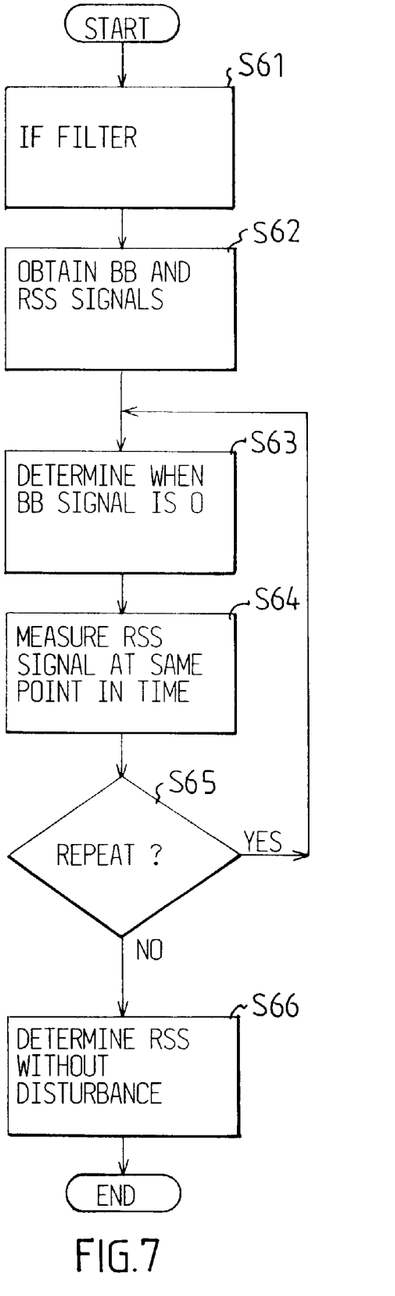
FIG. 7 is a flow chart of the actions taken to carry out the method according to a general embodiment of the invention.

FIG. 7 is a flow chart showing the general principle of the method to regenerate the RSS signal without the influence of the attenuation ripple in the IF filter. For simplification, it is assumed that the level to be detected by the level detector 9, 119, 209 has been set to zero. The procedure starts between the mixing unit 3, 103, 203 and the IF filter 7, 106, 207, in FIG. 1, 5, and 6, respectively. Therefore, the first two steps S61 and S62 are carried out in ways known in the art.

Step S61: The signal is filtered using an IF filter to obtain one signal channel.

Step S62: The signal is transmitted to the FM detector, and the RSSI circuit. The BB and RSS signals are obtained.

Step S63: At least one point in time in which the BB signal is 0, or substantially 0, is determined.

Step S64: The signal strength of the RSS signal is measured at the point or points in time found in step S63.

Step S65: Should the procedure be repeated for other parts of the signal? If yes, go to step S63, if no go to step S66.

Step S66: Use the sampling points obtained in step S64 to regenerate the RSS signal.

Figure 8:
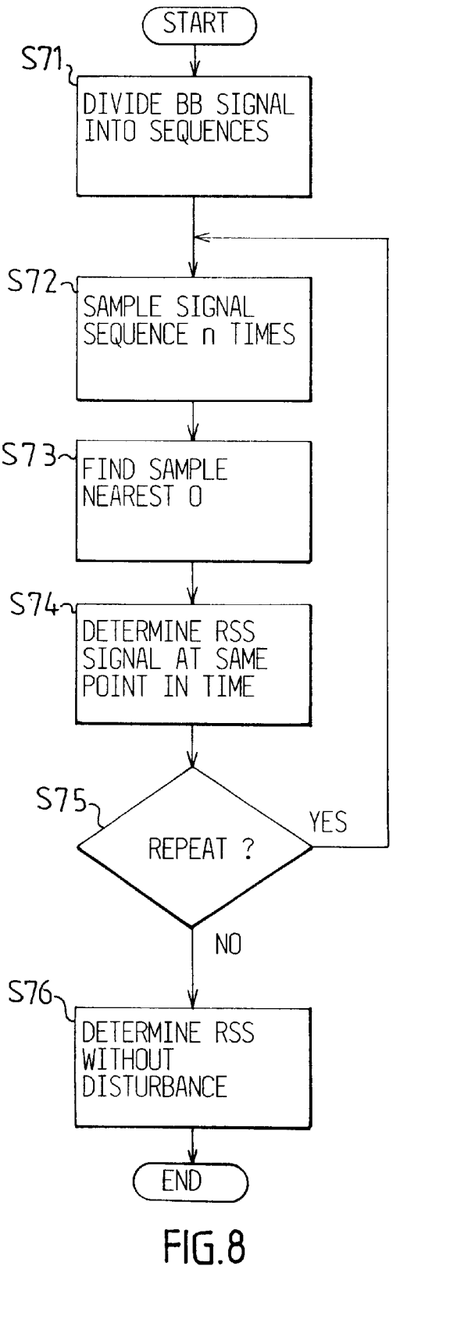
FIG. 8 is a flow chart of the actions taken to carry out the method according to the first preferred embodiment of the invention.

FIG. 8 shows the method according to the first embodiment of the invention. This flow chart starts after step S62 in FIG. 7, and as before, it is assumed that the level has been set to zero.

Step S71: Divide the BB signal into sequences.

Step S72: Sample a sequence of the BB signal n times.

Step S73: Find the sample having a value nearest zero of the samples taken in step S72.

Step S74: Find the value of the RSS signal at the same point in time as the sample of the BB signal found in step S73.

Step S75: Should the procedure be repeated for other parts of the signal? If yes, go to step S72, if no go to step S76.

Step S76: Use the sampling points obtained in step S74 to regenerate the RSS signal.

Figure 9:
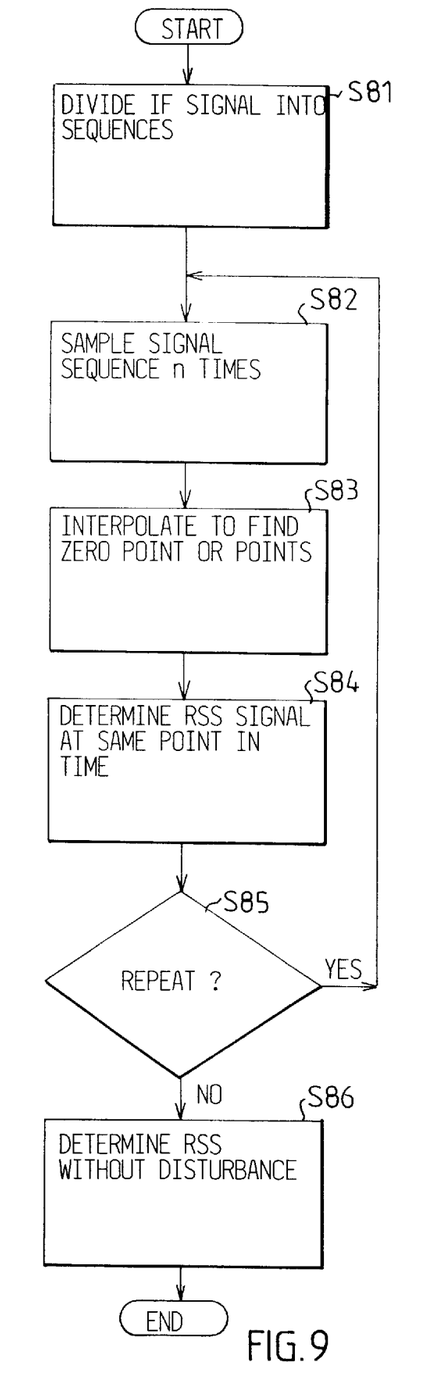
FIG. 9 is a flow chart of the actions taken to carry out the method according to a further development of the first preferred embodiment of the invention.

FIG. 9 shows the method according to a development of the first embodiment of the invention. This flow chart starts at the same point as FIG. 8.

Step S81: Divide the BB signal into sequences.

Step S82: Sample a sequence of the BB signal n times.

Step S83: Interpolate between at least two of the samples obtained in step S82 to find at least one point in time at which the FM signal is zero.

Step S84: Find the value of the RSS signal at the point or points in time found in step S83.

Step S85: Should the procedure be repeated for other parts of the signal? If yes, go to step S82, if no go to step S86.

Step S86: Use the sampling points obtained in step S84 to regenerate the RSS signal.

Figure 10:
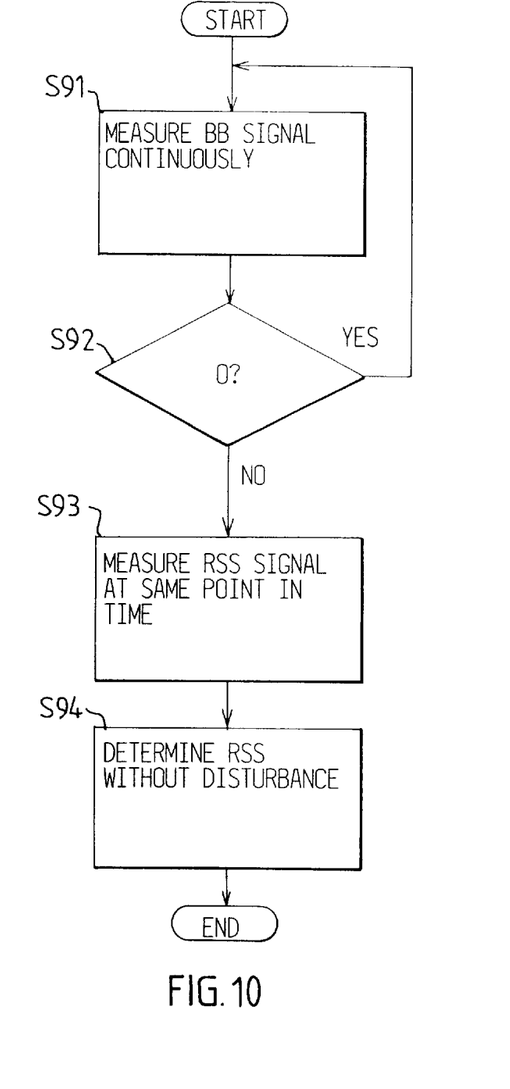
FIG. 10 is a flow chart of the actions taken to carry out the method according to the second preferred embodiment of the invention.

FIG. 10 is a flow chart illustrating the steps of regenerating the RSS signal according to the second embodiment of the invention.

Step S91: Measure the BB signal strength continually.

Step S92: Is the signal strength zero? If yes, go to step S93; if no, go to step S91.

Step S93: Measure the signal strength of the RSS signal at exactly the point in time at which the BB signal is zero, that is, when the level detector is triggered.

Step S94: When the measurements are finished, use the values obtained in step S93 to regenerate the RSS signal.

For FIGS. 7–10 above, to keep the discussion simple, it has been assumed that the zero level has been selected as the level to be detected. As stated above, of course, any level could be selected.

The method may be adapted to a system using antenna diversity. Because of the phase relationship between the carrier and the interfering signal at the antenna, the two signals received are measured individually. The two calculated C/I ratio values are added at a later stage by a diversity processing algorithm.

According to a preferred embodiment, a Maximum Ratio Combining (MRC) algorithm is used, taking the average for 1000 samples of RSSI_A and RSSI_B, respectively. Such algorithms, and other diversity processing algorithms are well known in the art.

What is claimed is:

1. A Carrier over Interference (C/I) measuring apparatus for a signal having a fluctuating carrier frequency, comprising:

an intermediate frequency (IF) filter for filtering the signal;

a sampling unit for sampling a Received Signal Strength (RSS) of the signal;

a level detecting unit for monitoring a Base Band (BB) of the signal, wherein the level detecting unit controls the sampling unit such that when the amplitude of the BB signal is equal to a level specified in the level detecting unit, the sampling unit samples the RSS signal; and a processing unit for measuring the RSS signal unaffected by the frequency dependent attenuation in the IF filter.

2. A C/I measuring apparatus according to claim 1, further comprising means for determining at least one point in time when the BB signal is substantially equal to a constant carrier frequency deviation.

3. A C/I measuring apparatus according to claim 1, further comprising means for determining at least one point in time at which the BB signal is substantially equal to the level specified in the level detecting unit and measuring the RSS signal at the at least one point in time.

4. A C/I measuring apparatus according to claim 3, comprising:

means for dividing the BB signal into measurement sequences;

means for taking the least two samples in each measurement sequence of the BB signal;

means for Interpolating between at least two samples in each measurement sequence of the BB signal to obtain at least one point in which the carrier frequency deviation and the IF filter attenuation is constant; and means for sampling the RSS signal at the at least one calculation point of the BB signal.

5. A method of measuring a Carrier over Interference (C/I) of a received signal comprising the steps of:

filtering the signal using an Intermediate Frequency (IF) filter to obtain one signal channel;

feeding the signal to a Frequency Modulation (FM) detector and a Received Signal Strength Indicator (RSSI) unit;

monitoring a Base Band (BB) signal by a level detecting unit;

triggering a measuring device to sample the RSS signal when the BB signal is equal to the levels specified in the level detecting unit;

using the samples to regenerate the RSS signal; and measuring the signal strength of the received signal at a selected, substantially constant, carrier frequency.

6. A method according to claim 5, wherein the selected carrier frequency is selected so that the attenuation of the filter is substantially stable for frequencies near the selected carrier frequency.

7. A method according to claim 5, wherein the selected carrier frequency is substantially the center frequency of the filter.

8. A method according to claim 5, comprising the steps of:

determining at least one point in time at which the BB signal is substantially equal to a constant carrier frequency deviation; and measuring the RSS signal at the at least one point in time.

9. A method according to claim 8, comprising the steps of:

dividing the BB signal into measurement sequences;

taking at least one sample in each measurement sequence of the BB signal;

selecting for each measurement sequence at least one sample nearest to a zero level; and sampling the RSS signal at the at least one selected sample of the BB signal.

10. A method according to claim 8, comprising the steps of:

dividing the BB signal into measurement sequences;

taking at least one sample in each measurement sequence of the BB signal;

interpolating between at least two samples in each measurement sequence to obtain at least one point in which the carrier frequency deviation and the IF filter attenuation of the BB signal is constant; and sampling the RSS signal at the at least one interpolated zero point of the BB signal.

* * * * *